United States Patent
Yang et al.

(10) Patent No.: US 12,378,460 B2
(45) Date of Patent: Aug. 5, 2025

(54) PLUGGING AGENT FOR OIL EXTRACTION IN OILFIELD AND A PREPARATION METHOD THEREFOR AND APPLICATION THEREOF

(71) Applicants: CHINA PETROLEUM & CHEMICAL CORPORATION, Beijing (CN); SINOPEC (BEIJING) RESEARCH INSTITUTE OF CHEMICAL INDUSTRY CO., LTD., Beijing (CN)

(72) Inventors: Jinbiao Yang, Beijing (CN); Zhuo Yi, Beijing (CN); Xi Liu, Beijing (CN); Lunyu Zhu, Beijing (CN); Zhao Fang, Beijing (CN); Xiaona Hu, Beijing (CN); Yajing Li, Beijing (CN); Ruiqi Zhang, Beijing (CN)

(73) Assignees: CHINA PETROLEUM & CHEMICAL CORPORATION, Beijing (CN); SINOPEC (BEIJING) RESEARCH INSTITUTE OF CHEMICAL INDUSTRY CO., LTD., Beijing (CN)

(*) Notice: Subject to any disclaimer, the term of this patent is extended or adjusted under 35 U.S.C. 154(b) by 10 days.

(21) Appl. No.: 18/257,923

(22) PCT Filed: Oct. 27, 2021

(86) PCT No.: PCT/CN2021/126751
§ 371 (c)(1),
(2) Date: Jun. 16, 2023

(87) PCT Pub. No.: WO2022/134839
PCT Pub. Date: Jun. 30, 2022

(65) Prior Publication Data
US 2024/0052232 A1 Feb. 15, 2024

(30) Foreign Application Priority Data

Dec. 24, 2020 (CN) .......................... 202011552715.X
Dec. 24, 2020 (CN) .......................... 202011552736.1
Dec. 24, 2020 (CN) .......................... 202011554138.8
Jan. 14, 2021 (CN) .......................... 202110049341.8

(51) Int. Cl.
*C09K 8/42* (2006.01)
*C09K 8/44* (2006.01)

(52) U.S. Cl.
CPC .............. *C09K 8/426* (2013.01); *C09K 8/44* (2013.01)

(58) Field of Classification Search
None
See application file for complete search history.

(56) References Cited

U.S. PATENT DOCUMENTS

| | | | | |
|---|---|---|---|---|
| 3,896,031 A * | 7/1975 | Carney | ..................... | C09K 8/22 507/131 |
| 4,141,843 A * | 2/1979 | Watson | ..................... | C09K 8/22 507/216 |
| 4,217,229 A * | 8/1980 | Watson | ................... | C09K 8/424 507/216 |
| 4,233,162 A * | 11/1980 | Carney | .................. | C09K 8/035 507/131 |
| 4,781,840 A | 11/1988 | Schilling et al. | | |
| 5,226,480 A | 7/1993 | Dovan et al. | | |
| 2011/0098384 A1 | 4/2011 | Blount | | |
| 2012/0012035 A1 | 1/2012 | Blank et al. | | |
| 2013/0277054 A1 | 10/2013 | Reddy et al. | | |
| 2014/0142221 A1* | 5/2014 | Bowles | ..................... | C09K 8/03 524/6 |

FOREIGN PATENT DOCUMENTS

| | | |
|---|---|---|
| CN | 1204677 A | 1/1999 |
| CN | 1327026 A | 12/2001 |
| CN | 102002351 A | 4/2011 |
| CN | 102093572 A | 6/2011 |
| CN | 102093573 A | 6/2011 |
| CN | 103498643 A | 1/2014 |
| CN | 103710011 A | 4/2014 |
| CN | 103773338 A | 5/2014 |
| CN | 104087274 A | 10/2014 |
| CN | 104387530 A | 3/2015 |
| CN | 106117462 A | 11/2016 |
| CN | 106367049 A | 2/2017 |
| CN | 106811185 A | 6/2017 |
| CN | 108191024 A | 6/2018 |
| CN | 108841369 A | 11/2018 |
| CN | 110938416 A | 3/2020 |

(Continued)

OTHER PUBLICATIONS

International Search Report (PCT/ISA/210) with an English translation, and Written Opinion (PCT/ISA/237) mailed on Jan. 6, 2022, by the China National Intellectual Property Administration (ISA/CN) as the International Searching Authority for International Application No. PCT/CN2021/126751. (9 pages).

Ma et al., "Crosslinking of Modified Sodium Lignosulfonate with Polyacrylamide", Oilfield Chemistry, 1990, vol. 7, No. 1, pp. 29-33, with an English abstract.

Ma et al., "An Experimental Study on Modified Sodium Lignosulfonate Used for Subterranean Plugging Agent", Journal of Xi'An Petroleum Institute, Sep. 1990, vol. 5, No. 3, pp. 55-59, with an English abstract.

(Continued)

*Primary Examiner* — John J Figueroa
(74) *Attorney, Agent, or Firm* — Panitch Schwarze Belisario & Nadel LLP

(57) ABSTRACT

The present disclosure relates to the field of oilfield plugging agents, and in particular to a plugging agent for oil extraction in an oilfield and a preparation method therefor and an application thereof.

8 Claims, No Drawings

(56) References Cited

FOREIGN PATENT DOCUMENTS

CN 112851974 A 5/2021
JP 51-34229 A 3/1976

OTHER PUBLICATIONS

Chen et al., "Study on Synthesis of Lignin-Amide", Transactions of China Pulp and Paper, 2008, vol. 23, No. 1, pp. 48-50, with an English abstract.
Xin, "Study and application of lignin polyacrylamide chemical profile control agent", Zhejiang University, Master thesis, Sep. 2002, pp. 1-58, with an English abstract. (64 pages).

* cited by examiner

PLUGGING AGENT FOR OIL EXTRACTION IN OILFIELD AND A PREPARATION METHOD THEREFOR AND APPLICATION THEREOF

CROSS REFERENCE TO RELATED APPLICATIONS

The application claims benefit of the Chinese patent application No. 2020110552715. X filed on Dec. 24, 2020, the Chinese patent application No. 202011552736.1 filed on Dec. 24, 2020, the Chinese patent application No. 202011554138.8 filed on Dec. 24, 2020, and the Chinese patent application No. 202110049341.8 filed on Jan. 14, 2021, the contents of which are entirely incorporated herein by reference.

TECHNICAL FIELD

The present disclosure relates to the technical field of oilfield water plugging, profile control and channel sealing, and in particular to a plugging agent and a preparation method therefor and a use thereof.

BACKGROUND ART

When the degree of oilfield development increases, the water effluent from oil wells becomes a widespread problem during the oilfield development process, and chemical water plugging techniques may be used for plugging the effluent layer in order to reduce the water flow and enhance oil recovery. In general, a plugging agent injected into the water injection wells is called a profile control agent, a plugging agent injected into the oil wells is called a water-plugging agent. The water plugging and profile control technique is an effective means for improving the heterogeneity of reservoir stratum at low oil price, and achieving balanced displacement and stable yield of oilfields. In addition, the thick oil thermal recovery technique comprising the main development modes of steam stimulation and steam flooding is the main method used in the development of thick oil in countries around the world at present. During the whole process of pressure reduction oil recovery, especially in the later stage of the thick oil development, the problems such as lower injection-production ratio, low formation pressure, steam-channeling, heavy flooding with edge water, and serious difficulty for stable production are emerged due to limitations such as the non-development of the formation interlayer, permeability difference between the interlayers and the restrained development conditions, an injection of the plugging agent is required to block a high permeability layer in the subsurface and prevent the gas-channeling.

The existing plugging agents can be broadly classified into jelly type, gel type, precipitation type, particle type, microsphere type, foam type and microorganism type, wherein the jelly system is the most used and widely applied type of plugging agent in plugging technologies in the domestic and foreign countries, and the system is provided with a spatial network structure formed by using polymer as the main agent and utilizing $Cr^{3+}$, $Al^{3+}$, phenolic resin, phenol, resorcinol and the like as a cross-linking agent.

However, given that the price of fossil-based raw materials fluctuates, and the on-site operation process in the oilfields imposes higher requirements on the bio-degradability, irritation and ecotoxicity of oilfield chemicals, the manufacturing industry of bulk oilfield chemicals will mainly evolve along the directions of the highly efficient utilization of resources, diversification of raw materials, high added value of products, and low carbon and environmentally friendly production process in the future. In contrast to the conventional petrochemical refining and chemical synthesis process, the bio-manufacturing process having the green, efficient, mild, low carbon, sustainable features at present has become a world-wide and strategically emerging industry, and shows a rapidly growing pattern. Lignin is a complex natural macromolecule, its reservoir in nature is only second to cellulose, thus lignin is the second largest natural organic substance, and has a three-dimensional network structure consisting of hetero branched chains which are bound through phenylpropane groups with ether (C—O—C) or carbon-carbon bond (C—C). The industrial lignin is low-priced due to its abundant resources, and has various structure depending on the different source and separation method; the industrial lignin is mainly composed of active groups such as aryl group, phenolic hydroxyl, alcoholic hydroxyl, carbonyl, methoxyl, carboxyl and conjugated double bonds, and can perform many types of chemical reactions such as oxidation, reduction, hydrolysis, alcoholysis, photolysis, acylation, sulfonation, alkylation, halogenation, nitration, condensation, and graft copolymerization.

Moreover, the current polyacrylamide-chromium cross-linking agent or polyacrylamide-phenolic aldehyde cross-linking agent system carried out plugging by forming a gel/jelly having a cross-linked network structure through dehydration condensation of polyacrylamide and cross-linking agent in the deep formation. The plugging system is operated under the relatively high-salinity and high temperature conditions of oil layer, it has the defects of poor temperature resistance and insufficient colloidal strength due to its decreased stability caused by degradation of polymer, thus its properties need to be improved.

In the existing lignin plugging techniques, a majority of lignin is used directly, because of the less crosslinking sites and low crosslinking activity, high concentration of lignin and a large amount of cross-linking agents are used in the preparation process of the plugging agent, which has the defects of high costs and construction difficulties. In addition, the produced plugging agent has insufficient strength and poor temperature resistance, its blocking effect is limited. Therefore, the research and development of a water plugging and profile control that has low cost, excellent product properties and capable of maintaining product properties at high temperature is of great significance for the sustainable development of the water plugging and channel sealing technology.

SUMMARY OF THE INVENTION

The present disclosure is designed to overcome the above problems existing in the prior art, and provides a plugging agent for oil recovery in an oilfield and a preparation method therefor and a use thereof. The plugging agent comprises a ligninamide, which is obtained through modification of lignin, wherein the lignin is modified to substantially increase a cross-linking site of the lignin, improve a cross-linking activity of the lignin, thereby reducing the dosage of a primary agent and a cross-linking agent, such that the plugging agent can be controlled to form a gel in a wide range of oil reservoir temperature, so that temperature resistance is improved and the gel has higher strength; the plugging agent has the characteristics of desirable injection performance, high plugging strength, desired temperature resistance and wide applicable scope, so that the production cost of the plugging system is effectively reduced, the requirements for the performance of on-site construction, economy, and environmental production are satisfied, and the practicability is high.

In order to fulfill the above purpose, a first aspect of the present disclosure provides a plugging agent for oil recovery in an oilfield, wherein the plugging agent comprises a ligninamide.

A second aspect of the present disclosure provides a method of preparing a plugging agent comprising:

preparing a plugging agent by subjecting the ligninamide, the acrylamide-based polymer, the cross-linking agent and the stabilizer to a contact reaction in the presence of a solvent.

In a third aspect, the present disclosure provides a plugging agent produced with the aforementioned preparation method.

In a fourth aspect, the present disclosure provides a use of the aforementioned plugging agent for oil recovery in an oilfield.

Due to the technical scheme, the plugging agent provided by the present disclosure, and a preparation method therefor and a use thereof have produced the following favorable effects:

the plugging agent provided by the present disclosure comprises a ligninamide, which is obtained through modification of lignin, wherein the lignin is modified to substantially increase a cross-linking site of the lignin, improve a cross-linking activity of the lignin, thereby reducing the dosage of a primary agent and the cross-linking agent, such that the plugging agent can be controlled to form a gel in a wide range of oil reservoir temperature, so that temperature resistance is improved and the gel has higher strength; the plugging agent has the characteristics of desirable injection performance, high plugging strength, desired temperature resistance and wide applicable scope, so that the production cost of the plugging system is effectively reduced, the requirements for the performance of on-site construction, economy, and environmental production are satisfied, and the practicability is high.

Further, the plugging agent provided by the present disclosure comprises a hydrolyzed ligninamide, an acrylamide-based polymer, a chromium cross-linking agent, a stabilizer, a pH adjusting agent and water, the plugging agent can be controllably gelled (6 h-15 d) over a wide range of oil reservoir temperatures (30-120° C.), it does not break the gel at a maximum of 132 days, and has a dehydration rate less than 5%, thereby expanding the temperature range in use and having a higher strength. A long gelation time can be used for plugging the highly permeable strips of water injection well, and a short gelation time can be used for plugging a single water layer in oil well, it has the characteristics such as high viscosity, high plugging strength, controllable gelling time and wide application scope, so that the production cost of a water plugging and profile control system is effectively reduced, the requirements for the performance of on-site construction, economy, and environmental production are satisfied, and the practicability is high. Thus the plugging agent can be applied in the water plugging and profile control process during the oil extraction in oilfield.

Furthermore, the plugging agent provided by the present disclosure comprises a hydrolyzed ligninamide, a hydrolyzed acrylamide-based polymer, an aluminium cross-linking agent and a stabilizer, the plugging agent uses the biomass-based material to replace the petrochemical feedstock, and the water plugging and profile control system can be controllably gelled (16 h-30 d) over a wide range of oil reservoir temperatures (35-115° C.), it has a plugging rate larger than 89.2% and a breakthrough pressure gradient more than 1.25 MPa/m, it exhibits an improved temperature resistance and higher strength; the plugging system has the characteristics such as high viscosity of the system, high plugging strength, high applicable temperature, and low dosage of the primary agent and the cross-linking agent, so that the production cost of a water plugging and profile control system is effectively reduced, the requirements for the performance of on-site construction, economy, and environmental production are satisfied, and the practicability is high.

Further, the plugging agent provided by the present disclosure comprises a ligninamide, an acrylamide-based polymer, a polyethyleneimine and a stabilizer, the plugging agent use the biomass-based material to replace the petrochemical feedstock, and the water plugging and profile control system can be gelled in a controllable and delayed manner (3.5-9 d) under the high temperature condition of oil reservoir temperatures (35-115° C.), and has higher strength, thereby effectively reducing the production cost of the plugging agent.

Furthermore, the plugging agent provided by the present disclosure comprises a ligninamides, an acrylamide polymer, phenolic resin and a stabilizer, the plugging agent uses the biomass-based material to replace the petrochemical feedstock, and the water plugging and profile control system can chronically and effectively plug the steam channeling channel at higher oil reservoir temperature (140-250° C.) for a long time (50-120 d), and have a higher strength, thus the plugging agent provided by the invention is capable of effectively plugging the high permeability layers, adjusting the steam suction difference between high permeable layer and low permeable layer, changing the direction of injected steam, so as to fulfill the purposes of alleviating steam channeling, eliminating interferences between wells, expanding the swept volume of injected steam, and increasing the oil production in an oil recovery cycle, and achieving the efficient development of high temperature oil reservoirs.

DESCRIPTION OF THE PREFERRED EMBODIMENT

Preferred embodiments of the present disclosure will be described below with more details. Although the following content describes preferred embodiments of the present disclosure, it shall be comprehended that the present disclosure may be performed in various forms instead of being restrained by the embodiments described herein. On the contrary, the embodiments are provided so that the present disclosure will be more thorough and complete, and the scope of the present disclosure can be completely delivered to those skilled in the art.

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In a first aspect, the present disclosure provides a plugging agent for oil extraction in an oilfield comprising a ligninamide.

Lignin is a complex natural polymer, which has a three-dimensional network structure consisting of hetero branched chains which are bound through phenylpropane groups with ether (C—O—C) or carbon-carbon bond (C—C). The reservoir of lignin in nature is only second to cellulose, thus lignin is the second largest natural organic substance.

The inventors of the present disclosure have surprisingly discovered in researches that the ligninamide is obtained by subjecting the lignin to the amination modification and acylation modification, and the properties of a plugging agent may be significantly improved by using the ligninamide as a plugging agent, the speculated reasons may be that subjecting the lignin to the amination modification and acylation modification can increase cross-linking sites of the lignin and improve cross-linking activity of the lignin.

In particular, the modified ligninamide is interacted with the acrylamide-based polymer of the plugging agent, the rigid molecular structure of the ligninamide and the flexible molecular structure of the polymer is "supplementary" to form an interpenetrating network gel structure, in combination with the other components of the plugging agent in use, the plugging agent can be controlled to form a gel in a wide range of oil reservoir temperature, and the plugging agent has the characteristics of desirable injection performance, high plugging strength, desired temperature resistance and wide applicable scope, so that the production cost of a water plugging and profile control system is effectively reduced, the requirements for the performance of on-site construction, economy, and environmental production are satisfied, and the practicability is high.

According to the present disclosure, the ligninamide is a hydrolyzed ligninamide.

According to the present disclosure, a method of preparing the ligninamide comprising:

(1) subjecting a lignin and an organic amine to an amination reaction under a first alkaline condition to obtain a ligninamine;

(2) subjecting the ligninamine and an acyl chloride to an acylation reaction in a solution under a second alkaline condition, so as to obtain the ligninamide;

(3) optionally, subjecting the ligninamide to a hydrolysis reaction with a hydrolyzing agent to prepare a hydrolyzed ligninamide.

In the present disclosure, the lignin, organic amine and acyl chloride are all commercially available, and the effective amount of the lignin is preferably within a range of 80-99.9%.

According to the present disclosure, the lignin may be various lignins which are conventionally used in the art, preferably, the lignin is at least one selected from a group consisting of alkali lignin, enzymatically decomposed lignin, chlorinated lignin, steam-exploded lignin, lignosulfonate and sulfur lignin; more preferably enzymatically decomposed lignin, which is commercially available, for example, purchased from the Shandong Longlive Biotechnology Co., Ltd.

According to the present disclosure, the organic amine may be various organic amines which are conventionally used in the art, preferably, the organic amine is at least one selected from a group consisting of dimethylamine, ethylenediamine, trimethylamine, triethylamine, ethylene diamine, diethylenetriamine, triethylenetetramine, tetraethylenepentamine, pentaethylenehexamine, hexaethyleneheptamine, putrescine, cadaverine, spermidine and spermine.

More preferably, the organic amine is at least one selected from a group consisting of diethylenetriamine, triethylenetetramine, tetraethylenepentamine, pentaethylenehexamine and hexaethyleneheptamine.

According to the present disclosure, the used amount of the organic amine may be selected within a wide range, and in order to further improve the performance of the plugging agent, it is preferable that a mass ratio of the organic amine to the lignin is 0.05-4.5:1, for example, it may be 0.05:1, 0.1:1, 0.2:1, 0.3:1, 0.4:1, 0.5:1, 0.6:1, 0.7:1, 0.8:1, 0.9:1, 1:1, 1.1:1, 1.2:1, 1.3:1, 1.4:1, 1.5:1, 1.6:1, 1.7:1, 1.8:1, 1.9:1, 2:1, 2.1:1, 2.2:1, 2.3:1, 2.4:1, 2.5:1, 3:1, 3.5:1, 4:1, 4.5:1.

According to the present disclosure, it is preferable that a pH of the first alkaline condition is within a range of 10-11.5, and for example, the pH may be 10, 10.5, 11, 11.5.

According to the present disclosure, the amination reaction conditions may be altered within a wide range, provided that the amination modification of the lignin can be effectively performed; in order to further improve the properties of the plugging agent, it is preferable that the amination reaction conditions comprise a temperature of 60-75° C. (e.g., it may be 60° C., 65° C., 70° C., 75° C.) and a time of 1.5-4 h (e.g., it may be 1.5 h, 2 h, 2.5 h, 3 h, 3.5 h, 4 h, 4.5 h).

In a preferred embodiment of the present disclosure, the amination reaction is carried out in the presence of an aldehyde, which is preferably an aldehyde of C1-C5, such as formaldehyde, acetaldehyde, propionaldehyde, butyraldehyde, valeraldehyde, preferably formaldehyde, acetaldehyde, propionaldehyde, more preferably formaldehyde. In the preferred embodiment, the properties of the prepared plugging agent can be further enhanced.

Preferably, a mass ratio of the aldehyde to the lignin is within a range of 0.02-1.5:1, and for example, it may be 0.02:1, 0.05:1, 0.1:1, 0.3:1, 0.5:1, 0.7:1, 0.9:1, 1.1:1, 1.3:1, 1.35:1, 1.4:1, 1.45:1, 1.5:1.

According to the present disclosure, the acyl chloride in the step (2) may be various acyl chlorides which are conventionally used, preferably, the acyl chloride is at least one selected from a group consisting of acetyl chloride, benzoyl chloride, oxalyl chloride, chloroacetyl chloride, trichloroacetyl chloride, fatty acyl chloride, stearyl chloride, linoleyl chloride, oleic acid acyl chloride and palmitoyl chloride.

More preferably, the acyl chloride is at least one selected from a group consisting of oxalyl chloride, fatty acyl chloride, stearyl chloride, linoleyl chloride, oleic acyl chloride and palmitoyl chloride.

According to the present disclosure, the amount of acyl chloride used in the step (2) may be selected from a wide range, and for the sake of further improving performance of the plugging agent, it is preferable that a mass ratio of the acyl chloride to the ligninamine is within a range of 0.5-2.5:1 (for instance, it may be 0.5:1, 0.8:1, 1:1, 1.1:1, 1.2:1, 1.3:1, 1.4:1, 1.5:1, 1.8:1, 2:1, 2.2:1, 2.5:1).

According to the present disclosure, it is preferable that a pH value of the second alkaline condition in the step (2) is within a range of 8-9.5, and for example, it may be 8, 8.5, 9, 9.5.

According to the present disclosure, the acylation reaction conditions in the step (2) may be varied within a wide range, provided that the lignin is effectively subjected to an acylation modification to prepare a ligninamide, in order to further improve the properties of the plugging agent, it is preferable that the acylation reaction conditions include a temperature of 55-65° C. (e.g., 55° C., 60° C., 65° C.) and a time of 1-4 hours (e.g., 1 h, 1.5 h, 2 h, 2.5 h, 3 h, 3.5 h, 4 h, 4.5 h).

The inventors have found in a study that the better effects can be obtained by using the ligninamide in a plugging agent, wherein the ligninamide is prepared under the amination conditions consisting of a temperature of 60-75° C., a time of 1.5-4 h and a pH of 10-11.5, and the acylation conditions consisting of a temperature of 55-65° C., a time of 1-4 h and a pH of 8-9.5.

According to the present disclosure, the hydrolyzing agent may be any substance capable of hydrolyzing the obtained ligninamide, the hydrolyzing agent is preferably an alkaline, more preferably, the hydrolyzing agent is at least one selected from a group consisting of sodium hydroxide, sodium carbonate, sodium bicarbonate and potassium hydroxide.

In the present disclosure, the used amount of a hydrolyzing agent may be selected in a wide range, and in order to further improve the performance of the plugging agent, it is preferable that a mass ratio of the hydrolyzing agent to the ligninamide is 0.0001-0.8:1, more preferably 0.01-0.05:1, and the concentration of the hydrolyzing agent is within a range of 15-50 wt %.

In the present disclosure, the hydrolysis reaction conditions may be modified in a wide range, provided that the aminated and acylated ligninamides can be hydrolyzed. For the sake of further improving the performance of the plugging agent, it is preferable that the hydrolysis reaction conditions comprises a temperature of 60-80° C. (e.g., 60° C., 65° C., 70° C., 75° C., 80° C.) and a time of 2-12 hours (e.g., 2 h, 2.5 h, 3 h, 4.5 h, 4 h, 4.5 h, 5 h, 5.5 h, 6 h, 6.5 h, 7 h, 7.5 h, 8 h, 9 h, 10 h, 11 h, 12 h).

In a preferred embodiment of the present disclosure, the better effects can be obtained by using a hydrolyzed ligninamide in a plugging agent, wherein the hydrolyzed ligninamide is prepared under the amination conditions consisting of a temperature of 60-75° C., a time of 1.5-4 h and a pH of 10-11.5, the acylation conditions consisting of a temperature of 55-65° C., a time of 1-4 h and a pH of 8-9.5, and the hydrolysis reaction conditions comprising a temperature of 60-80° C. and a time of 2-12 hours.

In the present disclosure, the solution is preferably an aqueous solution.

In the present disclosure, the method of adjusting pH may be a method commonly used in the art, preferably, the pH adjustment is performed by adding an alkaline substance. The alkaline substance may be a sodium hydroxide solution, a potassium hydroxide solution, a sodium carbonate solution and the like.

According to a preferred embodiment of the present disclosure, a method of preparing the ligninamide comprising:
(1) preparing an aqueous lignin solution with the lignin under a first alkaline condition, and then adding an organic amine under a stirring condition to carry out an amination reaction, thereby obtaining a ligninamine;
(2) preparing an aqueous ligninamine solution with the ligninamine under a second alkaline condition, and then adding an acyl chloride under a stirring condition to carry out an acylation reaction, thereby obtaining a ligninamide;
(3) optionally, subjecting the ligninamide to a hydrolysis reaction with a hydrolyzing agent to prepare a hydrolyzed ligninamide.

Preferably, the concentration of lignin in an aqueous lignin solution is within a range of 3-50 wt %, for example, it may be 3 wt %, 5 wt %, 10 wt %, 15 wt %, 20 wt %, 25 wt %, 30 wt %, 35 wt %, 40 wt %, 45 wt %, 50 wt %.

Preferably, the organic amine is added to the aqueous lignin solution by means of a dropwise addition.

Preferably, the concentration of ligninamine in the aqueous ligninamine solution is within a range of 3-30 wt %.

Preferably, the acyl chloride is added to the aqueous ligninamine solution by means of a dropwise addition.

Preferably, the method of preparing the ligninamide comprising: adjusting the pH after completion of the amination reaction so as to precipitate the product, then washing and drying the product to obtain the intermediate product ligninamine.

In a particularly preferred embodiment of the present disclosure, the ligninamide is prepared with the following process:
(1) dissolving lignin and an alkali in water and stirring to prepare a lignin solution;
(2) subsequently adding an organic amine, adjusting the pH, further adding formaldehyde under a stirring condition, heating the solution to carry out a reflux reaction, adjusting the pH near neutral after completion of the reaction, and precipitating the product, washing and drying the product to obtain the intermediate product ligninamine;
(3) dissolving the intermediate product ligninamine in water, adjusting the pH, adding an acyl chloride under a stirring condition, continuing the reaction, then filtering, washing, drying and grinding the product to obtain ligninamide;
(4) optionally, mixing the ligninamide with the hydrolysate to carry out a hydrolysis reaction, subsequently drying and grinding the product to obtain a hydrolyzed ligninamide product.

Preferably, the ligninamide is prepared with the following process:
(1) dissolving lignin and NaOH in water at room temperature to prepare a lignin solution; wherein the concentration of lignin in said lignin solution is 3-50 wt %, and the concentration of NaOH in said lignin solution is 0.001-8 wt %;
(2) then dropwise adding an organic amine, adjusting the pH to 10-11.5, further dropwise adding formaldehyde under a stirring condition, heating the solution to carry out a reflux reaction, adjusting the pH to near neutral after the reaction is finished, precipitating the product, then washing and drying the product to obtain an intermediate product ligninamine; wherein a mass ratio of used amount of the organic amine, formaldehyde and lignin e is 0.05-4.5:0.02-1.5:1, the reaction temperature is 60-75° C., and the reaction time is 1.5-4 h;
(3) dissolving the intermediate product ligninamine in water and preparing a ligninamine with a concentration of 3-30 wt %, adjusting a pH and maintaining the pH to be within a range of 8-9.5, dropwise adding an acyl chloride under a stirring condition, then heating the solution to a temperature of 55-65° C. to continue the reaction process for 1-4 hours; after completion of the reaction, filtering, washing, drying and grinding the reaction product to obtain the ligninamide; wherein a mass ratio of the used amount of acyl chloride to ligninamine is 0.5-2.5:1.
(4) optionally, blending the ligninamide with the sodium hydroxide solution according to a certain ratio, hydrolyzing the ligninamide, sealing the mixture and then carrying out a reaction at 60-80° C. for 2-12 h; after the reaction, drying and grinding the reaction product to obtain the hydrolyzed ligninamide product; wherein a mass ratio of the used amount of the hydrolyzing agent and the ligninamide is 0.0001-0.8:1, the concentration of said hydrolyzing agent is 15-50 wt %.

According to the present disclosure, the plugging agent further comprises an acrylamide-based polymer, a cross-linking agent and a stabilizer.

In the present disclosure, the acrylamide-based polymer comprises an acrylamide homopolymer and/or an acrylamide copolymer.

The inventors of the present disclosure have discovered from researches that the ligninamide or hydrolyzed ligninamide in combination with an acrylamide-based polymer, a cross-linking agent and a stabilizer can be used for preparing a jelly system, thereby improving the properties of the plugging agents.

In the present disclosure, the content of each ingredient is not particularly limited, in order to produce the favorable effects, it is preferable that the ligninamide is contained in an amount of 0.1-5.5 wt % (e.g., it may be 0.1 wt %, 0.5 wt %, 1 wt %, 1.5 wt %, 2 wt %, 2.5 wt %, 3 wt %, 3.5 wt %, 4 wt %, 4.5 wt %, 5 wt %, 5.5 wt %, preferably 0.4-2 wt %), the acrylamide-based polymer is contained in an amount of 0.01-3.5 wt % (e.g., it may be 0.01 wt %, 0.05 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, 1.1 wt %, 1.2 wt %, 1.3 wt %, 1.4 wt %, 1.5 wt %, 2 wt %, 2.5 wt %, 3 wt %, 3.5 wt %, preferably 0.01-1.5 wt %), the cross-linking agent is contained in an amount of 0.05-4.5 wt % (e.g., it may be 0.05 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, 1.1 wt %, 1.2 wt %, 1.3 wt %, 1.4 wt %, 1.5 wt %, 1.6 wt %, 1.7 wt %, 1.8 wt %, 1.9 wt %, 2 wt %, 2.5 wt %, 3.0 wt %, 3.5 wt %, 4.0 wt %, 4.5 wt %, preferably 0.05-2 wt %), and the stabilizer is contained in an amount of 0.01-2.5 wt % (e.g., it may be 0.01 wt %, 0.03 wt %, 0.05 wt %, 0.1 wt %, 0.2 wt %, 0.3 wt %, 0.4 wt %, 0.5 wt %, 0.6 wt %, 0.8 wt %, 1 wt %, 1.3 wt %, 1.5 wt %, 1.8 wt %, 2 wt %, 2.2 wt %, 2.5 wt %, preferably 0.02-1 wt %), based on the total weight of the plugging agent.

According to the present disclosure, the acrylamide-based polymer may be a conventionally used variety of acrylamide-based polymers; in order to further enhance the properties of the prepared plugging agent, the acrylamide-based polymer is preferably at least one selected from a group consisting of an anionic acrylamide-based polymer, a cationic acrylamide-based polymer, a nonionic acrylamide-based polymer and an amphoteric acrylamide-based polymer.

More preferably, the acrylamide-based polymer is at least one selected from a group consisting of an anionic acrylamide-based polymer, a nonionic acrylamide-based polymer and an amphoteric acrylamide-based polymer.

According to the present disclosure, the acrylamide-based polymer has a weight average molecular weight within a range of 5,000,000-35,000,000 g/mol, preferably 6,000,000-30,000,000 g/mol, more preferably 15,000,000-25,000,000 g/mol, further more preferably 18,000,000-22,000,000 g/mol.

According to the present disclosure, the acrylamide-based polymer has a solid content being 80 wt % or more, preferably 85 wt % or more.

In a specific embodiment of the present disclosure, the acrylamide-based polymer is a hydrolyzed acrylamide-based polymer, in particular, the acrylamide-based polymer is a hydrolyzed anionic acrylamide-based polymer.

In the present disclosure, the hydrolyzed acrylamide polymer may be any hydrolyzed acrylamide polymer, preferably, for the sake of further improving properties of the prepared plugging agent, the hydrolyzed acrylamide-based polymer has a degree of hydrolysis within a range of 15-30%; the hydrolyzed acrylamide-based polymer is commercially available, for example, purchased from Shandong Baomo Biochemical Co., Ltd.

In the present disclosure, the hydrolyzed acrylamide-based polymer preferably has a weight average molecular weight within a range of 8,000,000-30,000,000 g/mol.

According to the present disclosure, the cross-linking agent is at least one selected from a group consisting of an aluminium cross-linking agent, polyethyleneimine, phenolic resin and a chromium cross-linking agent.

According to the present disclosure, it is preferable that the crosslinking agent is an aluminium crosslinking agent, which is at least one selected from a group consisting of aluminium citrate and polyaluminum; the aluminium citrate in the invention is commercially available, for example, purchased from Ningbo Chemical Material Co., Ltd.

Wherein the polyaluminum refers to the Aluminium Chlorohydrate (ACH), which has the Chinese name Aluminium Hydroxychloride, also known as polyaluminum or aluminium chlorohydrate, its molecular formula is $Al_2(OH)_5Cl \cdot 2H_2O$.

According to the present disclosure, the polyethyleneimine has a weight average molecular weight within a range of 3,000-100,000 g/mol and an effective content about 15-50 wt %; the polyethyleneimine in the invention may be commercially available. For example, the polyethyleneimine may be purchased from Shanghai Aladdin Biochemical Technology Co., Ltd.

According to the present disclosure, the phenolic resin may be a conventionally used phenolic resin; the phenolic resin preferably has a pH greater than 11 and a solid content greater than 38 wt. %.

According to the present disclosure, the chromium cross-linking agent is at least one selected from a group consisting of sodium dichromate, ammonium dichromate and potassium dichromate.

According to the present disclosure, the stabilizer is commercially available; preferably, the stabilizer is at least one selected from a group consisting of sodium thiosulfate, sodium sulfite, sodium bisulfite, sodium dithionite, meta-phenylene diamine, erythorbic acid and thiourea.

According to the present disclosure, the plugging agent further comprises a pH adjusting agent and water. In a preferred embodiment of the present disclosure, the plugging agent comprises a ligninamide, an acrylamide-based polymer, a cross-linking agent, a stabilizer, a pH adjusting agent and water. It is clear that, due to the purity problem of the raw materials in use, a part of impurities are inevitably present in each raw material, thus it is understandable that the water plugging and profile control agent is composed of a ligninamide, an acrylamide-based polymer, a cross-linking agent, a stabilizer, a pH adjusting agent, water, as well as impurities carried by each raw material per se.

In the present disclosure, the pH adjusting agent is contained in an amount of 0.01-0.45 wt %, more preferably 0.01-0.2 wt %, based on the total weight of the plugging agent.

According to the present disclosure, the pH adjusting agent may be an acidic or an alkaline substance commonly used in the art for adjusting pH; preferably, the pH adjusting agent is at least one selected from a group consisting of dilute hydrochloric acid, dilute sulfuric acid, sodium hydroxide solution, sodium carbonate solution, sodium bicarbonate solution, sodium acetate solution and ammonia water.

The type of water contained in the plugging agent is not specifically limited in the present disclosure, it may be river, lake, atmospheric water, seawater, underground water, artificially manufactured water, and water extracted from oilfield and the like, preferably the water having a mineralization level less than 100,000 mg/L, more preferably less than 30,000 mg/L, and a divalent ion content less than 3,000 mg/L.

Specific Embodiment I

In the present disclosure, the plugging agent comprises a hydrolyzed ligninamide, an acrylamide-based polymer, a chromium cross-linking agent, a stabilizer, a pH adjusting agent and water.

The inventors of the present disclosure have surprisingly discovered in researches that the hydrolyzed ligninamide is obtained by subjecting the lignin to amination, acylation and hydrolytic modification, subjecting the lignin to the amination and acylation modification can increase cross-linking sites of the lignin and improve cross-linking activity of the lignin, and finally improve properties of the plugging agent. The rigid molecular structure of the ligninamide and the flexible molecular structure of the polymer is "supplementary" to form an interpenetrating network gel structure, in combination with the other components of the plugging agent in use, the plugging agent can be controllably gelled (6 h-15 d) over a wide range of oil reservoir temperatures (30-120° C.), it does not break the gel at a maximum of 132 days, and has a dehydration rate less than 5%, thereby expanding the temperature range in use and having a higher strength. A long gelation time can be used for plugging the highly permeable strips of water injection well, and a short gelation time can be used for plugging a single water layer in oil well, it has the characteristics such as high viscosity, high plugging strength, controllable gelling time and wide application scope, so that the production cost of the plugging agent is effectively reduced, the requirements for the performance of on-site construction, economy, and environmental production are satisfied, and the practicability is high.

In the present disclosure, the preparation process and types of the hydrolyzed ligninamide, acrylamide-based polymer, chromium cross-linking agent, stabilizer and pH adjusting agent have been described in detail in the first aspect mentioned above, and the relevant content will not be repeated herein in order to avoid the unnecessary repetition.

In the present disclosure, the plugging agent comprises: a hydrolyzed ligninamide in an amount of 0.1-4.5 wt %;
an acrylamide-based polymer in an amount of 0.02-1.2 wt %;
a chromium cross-linking agent in an amount of 0.02-1.2 wt %;
a stabilizer in an amount of 0.03-1.8 wt %;
a pH adjusting agent in an amount of 0.01-0.45 wt %;
water in an amount of 90.85-99.82 wt %, based on the total weight of the plugging agent.

In order to further obtain favorable effects, in particular to enable the plugging agent to achieve controlled cross-linking at higher gel-forming temperatures and better gel strength, as a preferred scheme, the plugging agent comprises:
a hydrolyzed ligninamide in an amount of 0.5-2 wt %;
an acrylamide-based polymer in an amount of 0.05-0.5 wt %;
a chromium cross-linking agent in an amount of 0.05-0.4 wt %;
a stabilizer in an amount of 0.1-0.6 wt %;
a pH adjusting agent in an amount of 0.01-0.2 wt %;
water in an amount of 96.3-99.29 wt %, based on the total weight of the plugging agent.

Specific Embodiment II

In the present disclosure, the plugging agent comprises a hydrolyzed ligninamide, a hydrolyzed acrylamide-based polymer, an aluminium cross-linking agent and a stabilizer.

The inventors of the present disclosure have surprisingly discovered in researches that the hydrolyzed ligninamide is obtained by subjecting the lignin to amination, acylation and hydrolytic modification; the hydrolyzed ligninamide is used in combination with the hydrolyzed polyacrylamide, an aluminium-based cross-linking agent and additives for preparing an aluminium jelly system, which finally improves the properties of the plugging agent. The prepared plugging agent can be controllably gelled (16 h-30 d, preferably 18 h-8 d) over a wide range of oil reservoir temperature (35-115° C.), it has a plugging rate larger than 89.2%, preferably 98.3%, and a breakthrough pressure gradient more than 1.25 MPa/m, preferably 4.5 MPa/m, it exhibits an improved temperature resistance and higher strength; the plugging agent has the characteristics such as high viscosity of the system, high plugging strength, high applicable temperature, so that the production cost of a water plugging and profile control system is effectively reduced, the requirements for the performance of on-site construction, economy, and environmental production are satisfied, and the practicability is high.

In the present disclosure, the preparation process and types of the hydrolyzed ligninamide, hydrolyzed acrylamide-based polymer, cross-linking agent and stabilizer have been described in detail in the first aspect mentioned above, and the relevant content will not be repeated herein in order to avoid the unnecessary repetition.

Preferably, in order to further obtain better effects, for example, to enable the plugging agent to be controllably cross-linked at the higher gelling temperature and produce the desirable jelly strength, based on the total weight of the plugging agent, the hydrolyzed ligninamide is contained in an amount of 0.1-4.5 wt % (for example, it may be 0.1 wt %, 0.5 wt %, 1 wt %, 1.5 wt %, 2 wt %, 2.5 wt %, 3 wt %, 3.5 wt %, 4 wt %, 4.5 wt %, preferably 0.4-2 wt %); the hydrolyzed polyacrylamide is contained in an amount of 0.01-1.5 wt % (for example, it may be 0.01 wt %, 0.05 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, 1.1 wt %, 1.2 wt %, 1.3 wt %, 1.4 wt %, 1.5 wt %, preferably 0.01-0.5 wt %); the cross-linking agent is contained in an amount of 0.05-2 wt % (for example, it may be 0.05 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, 1.1 wt %, 1.2 wt %, 1.3 wt %, 1.4 wt %, 1.5 wt %, 1.6 wt %, 1.7 wt %, 1.8 wt %, 1.9 wt %, 2 wt %, preferably 0.2-1.2 wt %); and the stabilizer is contained in an amount of 0.03-0.6 wt % (for example, it may be 0.03 wt %, 0.05 wt %, 0.1 wt %, 0.2 wt %, 0.3 wt %, 0.4 wt %, 0.5 wt %, 0.6 wt %, preferably 0.05-0.4 wt %).

Specific Embodiment III

In the present disclosure, the plugging agent comprises a ligninamide, an acrylamide-based polymer, polyethyleneimine and a stabilizer.

The inventors of the present disclosure have surprisingly discovered in researches that the ligninamide is obtained by subjecting the lignin to amination modification and acylation modification; the ligninamide is used in combination with an acrylamide polymer, a cross-linking agent polyethyleneimine and a stabilizer for the preparation of a jelly system, the properties of the plugging agents are finally improved; that is, the delay-controllability of the gel forming process and colloidal strength are improved. The prepared plugging agent can be gelled in a controllable and delayed manner (3.5-9 d) under the high temperature condition of oil reservoir temperatures (55-100° C.), and has higher strength, thereby effectively reducing the production cost of the plugging agent.

In the present disclosure, the preparation process and types of the ligninamide, acrylamide-based polymer, cross-linking agent polyethyleneimine and stabilizer have been described in detail in the first aspect mentioned above, and the relevant content will not be repeated herein in order to avoid the unnecessary repetition.

In order to further obtain desirable effects, for example, to enable the profile control agent to produce a favorable time-delayed and controllable cross-linking and obtain a better jelly strength, it is preferable in the invention that based on the total weight of the plugging agent, the ligninamide is contained in an amount of 0.1-4.5 wt % (for example, it may be 0.1 wt %, 0.5 wt %, 1 wt %, 1.5 wt %, 2 wt %, 2.5 wt %, 3 wt %, 3.5 wt %, 4 wt %, 4.5 wt %, preferably 0.4-2 wt %); the polyacrylamide is contained in an amount of 0.1-3.5 wt % (e.g., 0.1 wt %, 0.2 wt %, 0.3 wt %, 0.4 wt %, 0.5 wt %, 0.6 wt %, 0.7 wt %, 0.8 wt %, 0.9 wt %, 1 wt %, 1.1 wt %, 1.2 wt %, 1.3 wt %, 1.4 wt %, 1.5 wt %, 2 wt %, 2.5 wt %, 3 wt %, 3.5 wt %, preferably 0.1-1.5 wt %); the cross-linking agent is contained in an amount of 0.05-1 wt % (e.g., it may be 0.05 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, preferably 0.2-0.8 wt %); the stabilizer is contained in an amount of 0.05-2.5 wt % (e.g., it may be 0.05 wt %, 0.1 wt %, 0.2 wt %, 0.3 wt %, 0.4 wt %, 0.5 wt %, 0.6 wt %, 0.8 wt %, 1 wt %, 1.3 wt %, 1.5 wt %, 1.8 wt %, 2 wt %, 2.2 wt %, 2.5 wt %, preferably 0.1-1 wt %).

Specific Embodiment IV

In the present disclosure, the plugging agent comprises a ligninamide, an acrylamide-based polymer, a phenolic resin and a stabilizer.

The inventors of the present disclosure have surprisingly discovered in researches that the ligninamide is obtained by subjecting the lignin to amination modification and acylation modification; the ligninamide is used in combination with an acrylamide-based polymer, a phenolic resin cross-linking agent and a stabilizer for the preparation of a jelly system, such that the plugging system can chronically and effectively plug the steam channeling channel at higher oil reservoir temperature (140-250° C.) for a long time (50-120 d), and have a higher strength, thus the plugging agent is capable of effectively plugging the high permeability layers, adjusting the steam suction difference between high permeable layer and low permeable layer, changing the direction of injected steam, so as to fulfill the purposes of alleviating vapor-channeling, eliminating cross-well interferences, expanding the swept volume of injected steam, and increasing the oil production in an oil recovery cycle, and achieving the efficient development of high temperature oil reservoirs.

In the present disclosure, the preparation process and types of the ligninamide, acrylamide-based polymer, cross-linking agent phenolic resin and stabilizer have been described in detail in the first aspect mentioned above, and the relevant content will not be repeated herein in order to avoid the unnecessary repetition.

In order to obtain favorable effects, for example, to enable the plugging agent to produce better effects and higher jelly strength, it is preferable that based on the total weight of the plugging agent, the ligninamide is contained in an amount of 0.1-5.5 wt % (for example, it may be 0.1 wt %, 0.5 wt %, 1 wt %, 1.5 wt %, 2 wt %, 2.5 wt %, 3 wt %, 3.5 wt %, 4 wt %, 4.5 wt %, 5 wt %, 5.5 wt %, preferably 0.4-2 wt %); the polyacrylamide is contained in an amount of 0.01-1.5 wt % (e.g., 0.01 wt %, 0.05 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, 1.1 wt %, 1.2 wt %, 1.3 wt %, 1.4 wt %, 1.5 wt %, preferably 0.1-0.5 wt %); the cross-linker phenolic resin is contained in an amount of 0.05-4.5 wt % (e.g., it may be 0.05 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, 1.5 wt %, 2 wt %, 2.5 wt %, 3.0 wt %, 3.5 wt %, 4.0 wt %, 4.5 wt %, preferably 0.2-2.0 wt %); the stabilizer is contained in an amount of 0.01-2 wt % (e.g., it may be 0.01 wt %, 0.03 wt %, 0.05 wt %, 0.1 wt %, 0.2 wt %, 0.3 wt %, 0.4 wt %, 0.5 wt %, 0.6 wt %, 0.8 wt %, 1 wt %, 1.3 wt %, 1.5 wt %, 1.8 wt %, 2 wt %, preferably 0.02-0.5 wt %).

A second aspect of the present disclosure provides a method of preparing a plugging agent comprising:

preparing a plugging agent by subjecting the ligninamide, the acrylamide-based polymer, the cross-linking agent and the stabilizer to a contact reaction in the presence of a solvent.

In the present disclosure, the preparation process, choices and types of the ligninamide, the acrylamide-based polymer, the cross-linking agent and the stabilizer have been described in detail in the first aspect mentioned above, and the relevant content will not be repeated herein in order to avoid the unnecessary repetition.

According to a preferred embodiment of the present disclosure, the method of preparing a plugging agent comprising:

(1) adding a ligninamide and an acrylamide-based polymer to water under a stirring state, such that the ingredients are uniformly dissolved;
(2) adding a cross-linking agent, a stabilizer and a pH adjusting agent to carry out a contact reaction, so as to prepare the plugging agent.

In the present disclosure, the sequence of adding the cross-linking agent, the stabilizer and the pH adjusting agent is not particularly limited, provided that the ingredients are uniformly mixed to produce the plugging agent.

In the present disclosure, the pH adjusting agent is preferably used in an amount such that the pH of the reaction system is within a range of 6-8, more preferably, the pH adjusting agent is used in an amount such that the pH of the reaction system does not cause precipitation of $Al^{3+}$, for example, the pH may be within a range of 5.5-6.5.

It is preferable in the present disclosure that the temperature and time of the contact reaction are not specifically defined, provided that the materials can be mixed uniformly.

A third aspect of the present disclosure provides a plugging agent produced with the aforementioned method.

A fourth aspect of the present disclosure provides a use of the aforementioned plugging agent for oil extraction in an oilfield.

The present disclosure will be described in detail below with reference to examples.

The complex viscosity was tested by using a rotational rheometer (purchased from Thermo Fisher Scientific Co., Ltd., with a model RS 6000).

The gel strength was tested by using the breakthrough vacuum method (the miniature bench vacuum pump purchased from Haimen Kylin-Bell Lab Instrument Manufacturing Co., Ltd., with a model GL-802A).

Plugging Rate Test:

a simulated rock core (the rock core had a diameter of 25 mm and a length of 200 mm) was filled and produced; the simulated rock core was vacuumized and saturated with water. The rock core was first filled with a 10% NaCl solution at a given flow rate, and the pre-plugging permeability ($k_0$) was measured; then a plugging agent solution prepared with a formula to be evaluated was injected in the forward or reverse direction, both ends of the rock core were blocked with screwed plug; the rock core was placed in a thermotank under a designated temperature for a specified number of days; finally, a 10 wt % NaCl solution was injected into the rock core to measure the post-plugging permeability (k') and the breakthrough pressure. The plugging rate was regarded as a parameter characterizing the plugging effects of the plugging agent, the calculation formula of the plugging rate is $$\eta = \frac{k_0 - k'}{k_0} \times 100\%.$$

Wherein $k_0$ denoted the pre-plugging permeability, $\mu m^2$; and k' denoted the post-plugging permeability, $\mu m^2$.

The breakthrough pressure gradient was calculated based on the determined breakthrough pressure and rock core size.

Lignin was enzymatically hydrolyzed lignin, which had a solid content of 94.8 wt % and was purchased from Shandong Longlive Biotechnology Co., Ltd.

The cross-linking agent aluminium citrate was purchased from Ningbo Chemical Material Co., Ltd., and the concentration of aluminium was 2,000 mg/kg.

The diethylenetriamine, tetraethylenepentamine, oleic acid acyl chloride and palmitoyl chloride were purchased from J&K Scientific Ltd.

Acrylamide-based polymer I, anionic acrylamide-based polymer having a solid content of 90 wt % was purchased from Shandong Baomo Biochemical Co., Ltd.

Acrylamide-based polymer II, anionic acrylamide-based polymer having a solid content of 89 wt % was purchased from Shandong Baomo Biochemical Co., Ltd.

The hydrolyzed acrylamide-based polymer III, hydrolyzed anionic acrylamide-based polymer was purchased from Shandong Baomo Biochemical Co., Ltd., which had a weight average molecular weight of 15,000,000 and a degree of hydrolysis of 25%.

The hydrolyzed acrylamide-based polymer IV, hydrolyzed anionic acrylamide-based polymer was purchased from Shandong Baomo Biochemical Co., Ltd., which had a weight average molecular weight of 10,000,000 and a degree of hydrolysis of 23%.

The hydrolyzed acrylamide-based polymer V, hydrolyzed anionic acrylamide-based polymer was purchased from Shandong Baomo Biochemical Co., Ltd., which had a weight average molecular weight of 20,000,000 and a degree of hydrolysis of 20%.

The hydrolyzed acrylamide-based polymer VI, hydrolyzed anionic acrylamide-based polymer was purchased from Shandong Baomo Biochemical Co., Ltd., which had a weight average molecular weight of 8,000,000 and a degree of hydrolysis of 25%.

The hydrolyzed acrylamide-based polymer VII, hydrolyzed anionic acrylamide-based polymer was purchased from Shandong Baomo Biochemical Co., Ltd., which had a solid content of 90 wt % and a weight average molecular weight of 15,500,000.

The acrylamide-based polymer VIII, the anionic acrylamide-based polymer was prepared according to the method of Example 1 in CN108017754A, which had a solid content of 89 wt % and a weight average molecular weight of 21,000,000.

The acrylamide-based polymer IX, the anionic acrylamide-based polymer was prepared according to the method of Example 2 in CN108017754A, both had a solid content of 91 wt % and a weight average molecular weight of 19,800,000.

The phenolic resin having a pH larger than 11 and a solid content greater than 38 wt % was purchased from Shandong Shida Oilfield Service Technology Service Co., Ltd.

Other ingredients without indicating the sources were all commercially available products.

Specific Embodiment I

Preparation Example 1

Preparation of Hydrolyzed Ligninamide L1
(1) 10 g of lignin and 1.67 g of NaOH were dissolved in water at room temperature and prepared into an aqueous lignin solution with a content of 15 wt %;
(2) 12 g of diethylenetriamine was then dropwise added into the aqueous lignin solution, the pH was adjusted to 10.5, 14.4 g of formaldehyde was further dropwise added under a stirring condition, the solution was subjected to heating and refluxing, a first contact reaction was performed at a temperature of 70° C. and a reaction time of 2.5 h, the pH was adjusted to near neutral after the completion of reaction, such that the product was precipitated and then subjected to washing and drying, to obtain an intermediate product ligninamine;
(3) 6 g of the intermediate product ligninamine was dissolved in water, the pH was adjusted and maintained at 8.5, 7.65 g of oleic acyl chloride was dropwise added under a stirring condition, the solution was then heated to 60° C. to carry out a second contact reaction for a reaction time of 3 h, the reaction product obtained after the reaction was further filtered, washed, dried and ground to obtain a ligninamide.
(4) 6.5 g of ligninamide was blended with 1.75 g of NaOH solution having a concentration of 30 wt %, the mixture was sealed and placed in 80° C. to carry out a third contact reaction (hydrolysis) for a reaction time of 8 h, the reaction product was dried and ground to prepare the hydrolyzed ligninamide product L1.

Preparation Example 2

Preparation of Hydrolyzed Ligninamide L2.

The hydrolyzed ligninamide was prepared according to the method in the Preparation Example 1, except that 12 g of diethylenetriamine was replaced by 21.6 g of tetraethylenepentamine and 7.65 g of oleic acyl chloride was replaced by 7.05 g of palmitoyl chloride, so as to prepare the hydrolyzed ligninamide product L2.

Example 1

The example served to illustrate the plugging agent provided by the present disclosure.

9.2 g of hydrolyzed ligninamide L1 and 4.5 g of acrylamide-based polymer I were dissolved in 1 L of formulated water having a degree of mineralization of 6,000 mg/L, the ingredients were stirred at a rotation speed of 500 r/min to form a homogeneous solution; 2.56 g of thiourea, 0.14 g of ammonia water and 1.54 g of sodium dichromate were then added, and stirred uniformly to prepare a plugging agent. The gel formation temperature, the start time of gel formation, the complex viscosity after completion of the cross-linking reaction, the duration without breaking the gel under the gel formation temperature, and the dehydration rate of the plugging agent were shown in Table 1.

Example 2

The example served to illustrate the plugging agent provided by the present disclosure.

12.1 g of hydrolyzed ligninamide L2 and 3.8 g of acrylamide-based polymer I were dissolved in 1 L of formulation water with a degree of mineralization of 6,500 mg/L, the ingredients were stirred at a rotation speed of 500 r/min to form a homogeneous solution; 2.54 g of sodium dithionite, 0.23 g of ammonia and 1.81 g of sodium dichromate were then added, and stirred uniformly to prepare a plugging agent. The gel formation temperature, the start time of gel formation, the complex viscosity after completion of the cross-linking reaction, the duration without breaking the gel under the gel formation temperature, and the dehydration rate of the plugging agent were shown in Table 1.

Example 3

The example served to illustrate the plugging agent provided by the present disclosure.

6.3 g of hydrolyzed ligninamide L1 and 1.8 g of acrylamide-based polymer TT were dissolved in 1 L of formulation water having a degree of mineralization of 1,500 mg/L, the ingredients were stirred at a rotation speed of 500 r/min to form a homogeneous solution; 2.5 g of sodium bisulphite, 0.16 g of dilute hydrochloric acid and 2.02 g of sodium dichromate were subsequently added, and stirred uniformly to prepare a plugging agent. The gel formation temperature, the start time of gel formation, the complex viscosity after completion of the cross-linking reaction, the duration without breaking the gel under the gel formation temperature, and the dehydration rate of the plugging agent were shown in Table 1.

Example 4

The example served to illustrate the plugging agent provided by the present disclosure.

8.8 g of hydrolyzed ligninamide L2 and 3.2 g of acrylamide-based polymer II were dissolved in 1 L of formulated water having a degree of mineralization of 2,500 mg/L, the ingredients were stirred at a rotation speed of 500 r/min to form a homogeneous solution; 1.89 g of sodium thiosulfate, 0.32 g of ammonia and 1.74 g of sodium dichromate were then added, and stirred uniformly to prepare a plugging agent. The gel formation temperature, the start time of gel formation, the complex viscosity after completion of the cross-linking reaction, the duration without breaking the gel under the gel formation temperature, and the dehydration rate of the plugging agent were shown in Table 1.

Comparative Example 1

The Comparative Example served to illustrate the plugging agent as a reference.

The experiment was carried out according to the method of Example 1, except that the hydrolyzed ligninamide L1 and the acrylamide-based polymer I were replaced with the acrylamide-based polymer I having a mass equivalent with the total mass of both compounds, such that a plugging agent was prepared. The gel formation temperature, the start time of gel formation, the complex viscosity after completion of the cross-linking reaction, the duration without breaking the gel under the gel formation temperature, and the dehydration rate of the plugging agent were shown in Table 1.

Comparative Example 2

The Comparative Example served to illustrate the plugging agent as a reference.

The experiment was carried out according to the method of Example 2, except that the hydrolyzed ligninamide L2 and the acrylamide-based polymer I were replaced with the acrylamide-based polymer I having a mass equivalent with the total mass of both compounds, such that a plugging agent was prepared. The gel formation temperature, the start time of gel formation, the complex viscosity after completion of the cross-linking reaction, the duration without breaking the gel under the gel formation temperature, and the dehydration rate of the plugging agent were shown in Table 1.

Comparative Example 3

The Comparative Example served to illustrate the plugging agent as a reference.

The experiment was carried out according to the method of Example 3, except that the hydrolyzed ligninamide L1 and the acrylamide-based polymer II were replaced with the acrylamide-based polymer II having a mass equivalent with the total mass of both compounds, such that a plugging agent was prepared. The gel formation temperature, the start time of gel formation, the complex viscosity after completion of the cross-linking reaction, the duration without breaking the gel under the gel formation temperature, and the dehydration rate of the plugging agent were shown in Table 1.

Comparative Example 4

The Comparative Example served to illustrate the plugging agent as a reference.

The experiment was carried out according to the method of Example 4, except that the hydrolyzed ligninamide L2 and the acrylamide-based polymer II were replaced with the acrylamide-based polymer II having a mass equivalent with the total mass of both compounds, such that a plugging agent was prepared. The gel formation temperature, the start time of gel formation, the complex viscosity after completion of the cross-linking reaction, the duration without breaking the gel under the gel formation temperature, and the dehydration rate of the plugging agent were shown in Table 1.

Comparative Example 5

The Comparative Example served to illustrate the plugging agent as a reference.

The experiment was carried out according to the method of Example 1, except that the hydrolyzed ligninamide L1 was replaced with an equal mass of lignin, such that a plugging agent was prepared. The gel formation temperature, the start time of gel formation, the complex viscosity after completion of the cross-linking reaction, the duration without breaking the gel under the gel formation temperature, and the dehydration rate of the plugging agent were shown in Table 1.

TABLE 1

|  | Gel formation temperature (° C.) | Start time of gel formation | Complex viscosity (mPa · s) | Duration without breaking the gel (d) | Dehydration rate (%) |
|---|---|---|---|---|---|
| Example 1 | 80 | 5.5 d | 62310 | 99 | 3.2 |
| Example 2 | 90 | 4 d | 85030 | 91 | 3.5 |
| Example 3 | 115 | 20 d | 69670 | 101 | 4.5 |
| Example 4 | 60 | 9 d | 73480 | 132 | 1.2 |
| Comparative Example 1 | 80 | 30 h | 35230 | 37 | 12.5 |
| Comparative Example 2 | 90 | 29 h | 40510 | 42 | 13.2 |
| Comparative Example 3 | 115 | 24 h | 32360 | 28 | 21.2 |
| Comparative Example 4 | 60 | 35 h | 39750 | 60 | 9.3 |
| Comparative Example 5 | 80 | 7 d | 33910 | 78 | 4.1 |

As can be seen from comparison results of the Examples and Comparative Examples, the present disclosure finally improves properties of the water plugging and profile control agent by subjecting the lignin to amination, acylation and hydrolytic modification, so as to increase cross-linking sites of the lignin and improve cross-linking activity of the lignin. The plugging agent provided by the present invention can be controllably gelled (6 h-15 d) over a wide range of oil reservoir temperatures (30-120° C.), it does not break the gel at a maximum of 132 days, and has a dehydration rate less than 5%, thereby expanding the temperature range in use and having a higher strength, a long gelation time can be used for plugging the highly permeable strips of water injection well, and a short gelation time can be used for plugging a single water layer in oil well, the plugging agent has the characteristics such as high viscosity, high plugging strength, controllable gelling time and wide application scope, so that the production cost of the plugging agent is effectively reduced, the requirements for the performance of on-site construction, economy, and environmental production are satisfied, and the practicability is high.

Specific Embodiment II

Preparation Example 3

The Preparation Example served to illustrate the preparation of hydrolyzed ligninamide L3.
(1) 10 g of lignin and 1.62 g of NaOH were dissolved in water at room temperature and prepared into a lignin solution with a content of 15 wt %.
(2) 12.5 g of diethylenetriamine was then dropwise added into the lignin solution, the pH was adjusted to 10.5, 14.1 g of formaldehyde was further dropwise added under a stirring condition, the solution was subjected to heating and refluxing, a reaction was performed for 2.5 h, the pH was adjusted to near neutral after the completion of reaction, such that the product was precipitated and then subjected to washing and drying, to obtain an intermediate product ligninamine.
(3) 6 g of the ligninamine was dissolved in water, the pH was adjusted and maintained at 8.5, 7.53 g of oleic acyl chloride was dropwise added under a stirring condition, the solution was then heated to 60° C. to continue reaction for 3 h, after the reaction, the reaction product was filtered, washed, dried and ground to obtain a ligninamide.
(4) 6.5 g of ligninamide was added into water and swollen, subsequently blended with 0.21 g of NaOH solution having a concentration of 30 wt %, the mixture was sealed and placed in 60° C. to continue reaction for 8 h, after the reaction, the reaction product was dried and ground to prepare the hydrolyzed ligninamide product L3.

Preparation Example 4

The Preparation Example served to illustrate the preparation of hydrolyzed ligninamide L4.
The hydrolyzed ligninamide was prepared according to the method in the Preparation Example 3, except that 12.5 g of diethylenetriamine was replaced by 19.4 g of tetraethylenepentamine and 7.53 g of oleic acyl chloride was replaced by 6.8 g of palmitoyl chloride, so as to prepare the hydrolyzed ligninamide product L4.

Preparation Example 5

The Preparation Example served to illustrate the preparation of hydrolyzed ligninamide L5.
The hydrolyzed ligninamide was prepared according to the method in the Preparation Example 3, except that formaldehyde was not added in step (2), so as to prepare the hydrolyzed ligninamide product L5.

Example 5

The example served to illustrate the plugging agent provided by the invention.
12.1 g of hydrolyzed ligninamide L3 and 1.6 g of hydrolyzed acrylamide-based polymer III were dissolved in formulated water having a degree of mineralization of 13,000 mg/L (divalent ions below 3,000 mg/L), the ingredients were stirred at a rotation speed of 500 r/min to form a homogeneous solution; 1.11 g of sodium bisulfite and 2 g of aluminium citrate were then added, the system pH was adjusted such that the $Al^{3+}$ was not precipitated, the total mass of the system was 1 kg, and the system was uniformly stirred to prepare a plugging agent. The gel formation temperature, the start time of gel formation, the complex viscosity after completion of the cross-linking reaction, the plugging rate and breakthrough pressure gradient of the plugging agent were shown in Table 2.

Example 6

The example served to illustrate the plugging agent provided by the invention.

4 g of hydrolyzed ligninamide L3 and 5 g of hydrolyzed acrylamide polymer IV were dissolved in formulated water having a degree of mineralization of 15,000 mg/L, the ingredients were stirred at a rotation speed of 500 r/min to form a homogeneous solution; 4 g of sodium bisulfite and 8 g of aluminium citrate were then added, the system pH was adjusted such that the $Al^{3+}$ was not precipitated, the total mass of the system was 1 kg, and the system was uniformly stirred to prepare a plugging agent. The gel formation temperature, the start time of gel formation, the complex viscosity after completion of the cross-linking reaction, the plugging rate and breakthrough pressure gradient of the plugging agent were shown in Table 2.

Example 7

The example served to illustrate the plugging agent provided by the invention.

20 g of hydrolyzed ligninamide L3 and 0.1 g of hydrolyzed acrylamide polymer V were dissolved in formulated water having a degree of mineralization of 18,000 mg/L, the ingredients were stirred at a rotation speed of 500 r/min to form a homogeneous solution; 0.5 g of sodium bisulfite and 12 g of aluminium citrate were then added, the system pH was adjusted such that the $Al^{3+}$ was not precipitated, the total mass of the system was 1 kg, and the system was uniformly stirred to prepare a plugging agent. The gel formation temperature, the start time of gel formation, the complex viscosity after completion of the cross-linking reaction, the plugging rate and breakthrough pressure gradient of the plugging agent were shown in Table 2.

Example 8

The example served to illustrate the plugging agent provided by the invention.

The plugging agent was prepared according to the method of Example 5, except that the plugging agent was prepared by replacing the hydrolyzed acrylamide-based polymer III with the hydrolyzed acrylamide-based polymer VI. The gel formation temperature, the start time of gel formation, the complex viscosity after completion of the cross-linking reaction, the plugging rate and breakthrough pressure gradient of the plugging agent were shown in Table 2.

Example 9

The example served to illustrate the plugging agent provided by the invention.

The plugging agent was prepared according to the method of Example 5, except that the hydrolyzed ligninamide L3 was replaced with the hydrolyzed ligninamide L4. The gel formation temperature, the start time of gel formation, the complex viscosity after completion of the cross-linking reaction, the plugging rate and breakthrough pressure gradient of the plugging agent were shown in Table 2.

Example 10

The example served to illustrate the plugging agent provided by the invention.

The plugging agent was prepared according to the method of Example 5, except that the hydrolyzed ligninamide L3 was replaced with the hydrolyzed ligninamide L5. The gel formation temperature, the start time of gel formation, the complex viscosity after completion of the cross-linking reaction, the plugging rate and breakthrough pressure gradient of the plugging agent were shown in Table 2.

Example 11

The example served to illustrate the plugging agent provided by the invention.

12.4 g of hydrolyzed ligninamide L4 and 1.9 g of hydrolyzed acrylamide-based polymer III were dissolved in formulated water having a degree of mineralization of 18,000 mg/L, the ingredients were stirred at a rotation speed of 500 r/min to form a homogeneous solution; 1.39 g of thiourea and 1.62 g of aluminium citrate were then added, the system pH was adjusted such that the $Al^{3+}$ was not precipitated, the total mass of the system was 1 kg, and the system was uniformly stirred to prepare a plugging agent. The gel formation temperature, the start time of gel formation, the complex viscosity after completion of the cross-linking reaction, the plugging rate and breakthrough pressure gradient of the plugging agent were shown in Table 2.

Example 12

The example served to illustrate the plugging agent provided by the invention.

10.9 g of hydrolyzed ligninamide L3 and 2.4 g of hydrolyzed acrylamide-based polymer III were dissolved in formulated water having a degree of mineralization of 10,000 mg/L the ingredients were stirred at a rotation speed of 500 r/min to form a homogeneous solution; 1.45 g of thiourea and 1.1 g of aluminium citrate were subsequently added, the system pH was adjusted such that the $Al^{3+}$ was not precipitated, the total mass of the system was 1 kg, and the system was uniformly stirred to prepare a plugging agent. The gel formation temperature, the start time of gel formation, the complex viscosity after completion of the cross-linking reaction, the plugging rate and breakthrough pressure gradient of the plugging agent were shown in Table 2.

Example 13

The example served to illustrate the plugging agent provided by the invention.

10.5 g of hydrolyzed ligninamide L4 and 3.5 g of hydrolyzed acrylamide-based polymer III were dissolved in formulation water having a degree of mineralization of 20,000 mg/L, the ingredients were stirred at a rotation speed of 500 r/min to form a homogeneous solution; 1.39 g of sodium bisulfite and 1.51 g of aluminium citrate were subsequently added, the system pH was adjusted such that the $Al^{3+}$ was not precipitated, the total mass of the system was 1 kg, and the system was uniformly stirred to prepare a plugging agent. The gel formation temperature, the start time of gel formation, the complex viscosity after completion of the cross-linking reaction, the plugging rate and breakthrough pressure gradient of the plugging agent were shown in Table 2.

Example 14

The example served to illustrate the plugging agent provided by the invention.

The water plugging and profile control system was prepared according to the method of Example 5, except that the hydrolyzed ligninamide L3 was replaced with the ligninamide to prepare a plugging agent. The gel formation temperature, the start time of gel formation, the complex viscosity after completion of the cross-linking reaction, the plugging rate and breakthrough pressure gradient of the plugging agent were shown in Table 2.

Example 15

The example served to illustrate the plugging agent provided by the invention.

The water plugging and profile control system was prepared according to the method of Example 11, except that the hydrolyzed ligninamide L4 was replaced with the ligninamide to prepare a plugging agent. The gel formation temperature, the start time of gel formation, the complex viscosity after completion of the cross-linking reaction, the plugging rate and breakthrough pressure gradient of the plugging agent were shown in Table 2.

Example 16

The example served to illustrate the plugging agent provided by the invention.

The water plugging and profile control system was prepared according to the method of Example 12, except that the hydrolyzed ligninamide L3 was replaced with the ligninamide to prepare a plugging agent. The gel formation temperature, the start time of gel formation, the complex viscosity after completion of the cross-linking reaction, the plugging rate and breakthrough pressure gradient of the plugging agent were shown in Table 2.

Example 17

The example served to illustrate the plugging agent provided by the invention.

The water plugging and profile control system was prepared according to the method of Example 13, except that the hydrolyzed ligninamide L4 was replaced with the ligninamide to prepare a plugging agent. The gel formation temperature, the start time of gel formation, the complex viscosity after completion of the cross-linking reaction, the plugging rate and breakthrough pressure gradient of the plugging agent were shown in Table 2.

Example 18

The example served to illustrate the plugging agent provided by the invention.

The plugging agent was prepared according to the method of Example 5, except that the hydrolyzed acrylamide-type polymer III was replaced with the acrylamide-type polymer I to prepare the plugging agent. The gel formation temperature, the start time of gel formation, the complex viscosity after completion of the cross-linking reaction, the plugging rate and breakthrough pressure gradient of the plugging agent were shown in Table 2.

Comparative Example 6

The Comparative Example served to illustrate the plugging agent as a reference.

The plugging agent was prepared according to the method of Example 5, except that the plugging agent was prepared by replacing the hydrolyzed ligninamide L3 with an equal mass of the hydrolyzed acrylamide-based polymer III. The gel formation temperature, the start time of gel formation, the complex viscosity after completion of the cross-linking reaction, the plugging rate and breakthrough pressure gradient of the plugging agent were shown in Table 2.

Comparative Example 7

The Comparative Example served to illustrate the plugging agent as a reference.

The plugging agent was prepared according to the method of Example 11, except that the plugging agent was prepared by replacing the hydrolyzed ligninamide L4 with an equal mass of the hydrolyzed acrylamide-based polymer III. The gel formation temperature, the start time of gel formation, the complex viscosity after completion of the cross-linking reaction, the plugging rate and breakthrough pressure gradient of the plugging agent were shown in Table 2.

Comparative Example 8

The Comparative Example served to illustrate the plugging agent as a reference.

The plugging agent was prepared according to the method of Example 12, except that the plugging agent was prepared by replacing the hydrolyzed ligninamide L3 with an equal mass of the hydrolyzed acrylamide-based polymer III. The gel formation temperature, the start time of gel formation, the complex viscosity after completion of the cross-linking reaction, the plugging rate and breakthrough pressure gradient of the plugging agent were shown in Table 2.

Comparative Example 9

The Comparative Example served to illustrate the plugging agent as a reference.

The plugging agent was prepared according to the method of Example 13, except that the plugging agent was prepared by replacing the hydrolyzed ligninamide L4 with an equal mass of the hydrolyzed acrylamide-based polymer III. The gel formation temperature, the start time of gel formation, the complex viscosity after completion of the cross-linking reaction, the plugging rate and breakthrough pressure gradient of the plugging agent were shown in Table 2.

Comparative Example 10

The Comparative Example served to illustrate the plugging agent as a reference.

The plugging agent was prepared according to the method of Example 5, except that the plugging agent was prepared by replacing the hydrolyzed ligninamide L3 with an equal mass of lignin. The gel formation temperature, the start time of gel formation, the complex viscosity after completion of the cross-linking reaction, the plugging rate and breakthrough pressure gradient of the plugging agent were shown in Table 2.

TABLE 2

|  | Gel formation temperature (° C.) | Start time of gel formation | Complex viscosity (mPa · s) | Plugging rate (%) | Breakthrough pressure gradient (MPa/m) |
|---|---|---|---|---|---|
| Example 5 | 98 | 1 d | 51710 | 99.3 | 4.95 |
| Example 6 | 98 | 18 h | 59080 | 99.8 | 5.46 |
| Example 7 | 98 | 2.5 d | 59680 | 99.6 | 5.79 |
| Example 8 | 98 | 29 h | 42350 | 98.9 | 4.81 |
| Example 9 | 98 | 31 h | 49810 | 98.9 | 4.61 |
| Example 10 | 98 | 62 h | 40120 | 98.3 | 4.5 |
| Example 11 | 115 | 20 h | 58980 | 99.1 | 4.83 |
| Example 12 | 60 | 4.5 d | 49850 | 98.4 | 4.6 |
| Example 13 | 75 | 2.5 d | 54330 | 98.8 | 4.74 |
| Example 14 | 98 | 19 h | 11040 | 94.1 | 1.64 |
| Example 15 | 115 | 16 h | 13100 | 95.4 | 2.21 |
| Example 16 | 60 | 30 d | 9050 | 92.3 | 1.89 |
| Example 17 | 75 | 27 h | 11050 | 94.1 | 2.02 |
| Example 18 | 98 | 15 d | 12690 | 89.2 | 1.25 |
| Comparative Example 6 | 98 | 8 h | 39560 | 83.9 | 1.21 |
| Comparative Example 7 | 115 | 11 h | 31430 | 80.9 | 1.03 |
| Comparative Example 8 | 60 | 15 h | 56210 | 85.4 | 1.34 |
| Comparative Example 9 | 75 | 12 h | 51010 | 81.2 | 1.09 |
| Comparative Example 10 | 98 | 22 h | 13110 | 73.3 | 0.91 |

As can be seen from comparison results of the Examples and Comparative Examples, the present disclosure provides a novel lignin-modified product and a preparation method thereof, and inventively uses the lignin-modified product in the water plugging and profile control process of oilfield, the present disclosure finally improves properties of the plugging agent by subjecting the lignin to amination, acylation and hydrolytic modification, so as to increase cross-linking sites of the lignin and improve cross-linking activity of the lignin. The water plugging and profile control system provided by the invention can be controllably gelled over a wide range of oil reservoir temperatures, it has a plugging rate larger than 89.2%, more preferably larger than 98.3%, and a breakthrough pressure gradient more than 1.25 MPa/m, further preferably more than 4.5 MPa/m, it exhibits an improved temperature resistance and higher strength; the system has the characteristics such as high viscosity of the system, high plugging strength and high applicable temperature, so that the production cost of a water plugging and profile control system is effectively reduced, the requirements for the performance of on-site construction, economy, and environmental production are satisfied, and the practicability is high.

Specific Embodiment III

Preparation Example 6

The Preparation Example served to illustrate the preparation of ligninamide L6.
(1) 10 g of lignin and 1.6 g of NaOH were dissolved in water at room temperature and prepared into a lignin solution with a content of 15 wt %.
(2) 12 g of diethylenetriamine was then dropwise added into the lignin solution, the pH was adjusted to 10.5, 13.3 g of formaldehyde was further dropwise added under a stirring condition, the solution was subjected to heating and refluxing, a reaction was performed for 2.5 h, the pH was adjusted to near neutral after the completion of reaction, such that the product was precipitated and then subjected to washing and drying, to obtain an intermediate product ligninamine.
(3) 6 g of the ligninamine was dissolved in water, the pH was adjusted and maintained at 8.5, 7.33 g of oleic acyl chloride was dropwise added under a stirring condition, the solution was then heated to 60° C. to continue reaction for 3 h, after the reaction, the reaction product was filtered, washed, dried and ground to prepare the ligninamide L6.

Preparation Example 7

The Preparation Example served to illustrate the preparation of ligninamide L7.

The ligninamide was prepared according to the method in the Preparation Example 6, except that 12 g of diethylenetriamine was replaced by 23.1 g of tetraethylenepentamine and 7.33 g of oleic acyl chloride was replaced by 6.93 g of palmitoyl chloride, so as to prepare the ligninamide L7.

Preparation Example 8

The Preparation Example served to illustrate the preparation of ligninamide L8.

The ligninamide was prepared according to the method in the Preparation Example 6, except that formaldehyde was not added in step (2), so as to prepare the ligninamide product L8.

Example 19

The example served to illustrate the plugging agent provided by the present disclosure.

8.9 g of ligninamide L7 and 3 g of acrylamide-based polymer VIII were dissolved in formulated water having a degree of mineralization of 7,000 mg/L, the ingredients were stirred at a rotation speed of 500 r/min to form a homogeneous solution; 1.82 g of sodium bisulfite and 5.5 g of polyethyleneimine were subsequently added, the system pH was adjusted to 6.5, the total mass of the system was 1 kg, and the system was uniformly stirred to prepare a plugging agent. The gel formation temperature, the start time of gel formation, the complex viscosity after completion of the cross-linking reaction, and the gel strength of the plugging agent were shown in Table 3.

Example 20

The example served to illustrate the plugging agent provided by the present disclosure.

4 g of ligninamide L7 and 15 g of acrylamide-based polymer VIII were dissolved in formulation water having a degree of mineralization of 12,000 mg/L, the ingredients were stirred at a rotation speed of 500 r/min to form a homogeneous solution; 5 g of sodium bisulfite and 8 g of polyethyleneimine were subsequently added, the system pH was adjusted to 7, the total mass of the system was 1 kg, and the system was uniformly stirred to prepare a plugging agent. The gel formation temperature, the start time of gel formation, the complex viscosity after completion of the cross-linking reaction, and the gel strength of the plugging agent were shown in Table 3.

Example 21

The example served to illustrate the plugging agent provided by the present disclosure.

20 g of ligninamide L7 and 1 g of acrylamide-based polymer VIII were dissolved in formulated water having a degree of mineralization of 10,000 mg/L, the ingredients were stirred at a rotation speed of 500 r/min to form a homogeneous solution; 10 g of sodium bisulfite and 2 g of polyethyleneimine were subsequently added, the pH of the system was adjusted to 7.5, the total mass of the system was 1 kg, and the system was uniformly stirred to prepare a plugging agent. The gel formation temperature, the start time of gel formation, the complex viscosity after completion of the cross-linking reaction, and the gel strength of the plugging agent were shown in Table 3.

Example 22

The example served to illustrate the plugging agent provided by the present disclosure.

The plugging agent was prepared according to the method of Example 19, except that the sodium bisulphite was replaced by an equal mass of sodium thiosulfate to prepare the plugging agent. The gel formation temperature, the start time of gel formation, the complex viscosity after completion of the cross-linking reaction, and the gel strength of the plugging agent were shown in Table 3.

Example 23

The example served to illustrate the plugging agent provided by the present disclosure.

The plugging agent was prepared according to the method of Example 19, except that the acrylamide-based polymer VIII was replaced with an equal mass of the acrylamide-based polymer VII to prepare the plugging agent. The gel formation temperature, the start time of gel formation, the complex viscosity after completion of the cross-linking reaction, and the gel strength of the plugging agent were shown in Table 3.

Example 24

The example served to illustrate the plugging agent provided by the present disclosure.

The plugging agent was prepared according to the method of Example 19, except that the acrylamide-based polymer VIII was replaced with an equal mass of the acrylamide-based polymer IX to prepare the plugging agent. The gel formation temperature, the start time of gel formation, the complex viscosity after completion of the cross-linking reaction, and the gel strength of the plugging agent were shown in Table 3.

Example 25

The example served to illustrate the plugging agent provided by the present disclosure.

The plugging agent was prepared according to the method of Example 19, except that the ligninamide L7 was replaced with the ligninamide L6. The gel formation temperature, the start time of gel formation, the complex viscosity after completion of the cross-linking reaction, and the gel strength of the plugging agent were shown in Table 3.

Example 26

The example served to illustrate the plugging agent provided by the present disclosure.

The plugging agent was prepared according to the method of Example 19, except that the ligninamide L7 was replaced with the ligninamide L8. The gel formation temperature, the start time of gel formation, the complex viscosity after completion of the cross-linking reaction, and the gel strength of the plugging agent were shown in Table 3.

Example 27

The example served to illustrate the plugging agent provided by the present disclosure.

7 g of the ligninamide L6 and 4.4 g of the acrylamide-based polymer VIII were dissolved in formulation water having a degree of mineralization of 12,000 mg/L, the ingredients were stirred at a rotation speed of 500 r/min to form a homogeneous solution; 1.46 g of sodium dithionite and 4.2 g of polyethyleneimine were subsequently added, the system pH was adjusted to 7.5, the total mass of the system was 1 kg, and the system was uniformly stirred to prepare a plugging agent. The gel formation temperature, the start time of gel formation, the complex viscosity after completion of the cross-linking reaction, and the gel strength of the plugging agent were shown in Table 3.

Comparative Example 11

The Comparative Example served to illustrate the plugging agent as a reference.

The plugging agent was prepared according to the method of Example 19, except that the plugging agent was prepared by replacing the ligninamide L7 with an equal mass of the acrylamide-type polymer VIII. The gel formation temperature, the start time of gel formation, the complex viscosity after completion of the cross-linking reaction, and the gel strength of the plugging agent were shown in Table 3.

Comparative Example 12

The Comparative Example served to illustrate the plugging agent as a reference.

The plugging agent was prepared according to the method of Example 27, except that the plugging agent was prepared by replacing the ligninamide L6 with an equal mass of the acrylamide-type polymer VIII. The gel formation temperature, the start time of gel formation, the complex viscosity after completion of the cross-linking reaction, and the gel strength of the plugging agent were shown in Table 3.

Comparative Example 13

The Comparative Example served to illustrate the plugging agent as a reference.
The plugging agent was prepared according to the method of Example 24, except that the plugging agent was prepared by replacing the ligninamide L7 with an equal mass of the acrylamide-type polymer IX. The gel formation temperature, the start time of gel formation, the complex viscosity after completion of the cross-linking reaction, and the gel strength of the plugging agent were shown in Table 3.

Comparative Example 14

The Comparative Example served to illustrate the plugging agent as a reference.
The plugging agent was prepared according to the method of Example 19, except that the plugging agent was prepared by replacing the ligninamide L7 with the ligninamine prepared in step (2). The gel formation temperature, the start time of gel formation, the complex viscosity after completion of the cross-linking reaction, and the gel strength of the plugging agent were shown in Table 3.

Comparative Example 15

The Comparative Example served to illustrate the plugging agent as a reference.
The plugging agent was prepared according to the method of Example 19, except that the plugging agent was prepared by replacing the ligninamide L7 with an equal mass of the lignin. The gel formation temperature, the start time of gel formation, the complex viscosity after completion of the cross-linking reaction, and the gel strength of the plugging agent were shown in Table 3.

TABLE 3

|  | Gel formation temperature (° C.) | Start time of gel formation | Complex viscosity (mPa · s) | Gel strength (MPa) |
| --- | --- | --- | --- | --- |
| Example 19 | 75 | 8.5 | 29560 | >0.08 |
|  | 100 | 5 | 28250 | >0.08 |
|  | 55 | 8 | 26750 | >0.08 |
| Example 20 | 75 | 3.5 | 29650 | 0.08 |
| Example 21 | 75 | 9.5 | 29950 | >0.08 |
| Example 22 | 75 | 8 | 28990 | >0.08 |
| Example 23 | 75 | 5.5 | 25690 | 0.07 |
| Example 24 | 75 | 8 | 28800 | >0.08 |
| Example 25 | 75 | 9 | 29790 | >0.08 |
| Example 26 | 75 | 4 | 21500 | 0.06 |
| Example 27 | 95 | 6.5 | 27540 | 0.08 |
| Comparative Example 11 | 75 | 2.5 | 15540 | 0.05 |
| Comparative Example 12 | 95 | 1 | 19040 | 0.06 |
| Comparative Example 13 | 75 | 2.5 | 13780 | 0.04 |
| Comparative Example 14 | 75 | 0.5 | 8120 | 0.01 |
| Comparative Example 15 | 75 | 1 | 9880 | 0.01 |

As can be seen from comparison results of the Examples and Comparative Examples, the present disclosure provides a novel lignin-modified product and a preparation method thereof, and inventively uses the lignin-modified product in the water plugging and profile control process of oilfield, the present disclosure finally improves properties of the water plugging and profile control agent by subjecting the lignin to amination, acylation and hydrolytic modification, so as to increase cross-linking sites of the lignin and improve cross-linking activity of the lignin. The plugging agent provided by the present disclosure can be gelled in a controllable and delayed manner in a long gel formation time (3.5-9 d) under the high temperature of gel formation (55-100° C.), and the jelly has higher strength; in addition, the production cost of the plugging agent is effectively reduced.

Specific Embodiment IV

Preparation Example 9

The Preparation Example served to illustrate the preparation of ligninamide L9.
(1) 10 g of lignin and 1.53 g of NaOH were dissolved in water at room temperature and prepared into a lignin solution with a content of 15 wt % under a stirring rate of 400 r/min.
(2) 12 g of diethylenetriamine was then dropwise added into the lignin solution, the pH was adjusted to 10.7, 14.8 g of formaldehyde was further dropwise added under a stirring rate of 350 r/min, the solution was subjected to heating and refluxing, a reaction was performed for 2.8 h, the pH was adjusted to near neutral after the completion of reaction, such that the product was precipitated and then subjected to washing and drying, to obtain an intermediate product ligninamine.
(3) 6 g of the ligninamine was dissolved in water, the pH was adjusted and maintained at 8.6, 7.48 g of oleic acyl chloride was dropwise added under a stirring rate of 350 r/min, the solution was then heated to 55° C. to continue reaction for 2.75 h, after the reaction, the reaction product was filtered, washed, dried and ground to prepare the ligninamide L9.

Preparation Example 10

The Preparation Example served to illustrate the preparation of ligninamide L10.
The ligninamide was prepared according to the method in the Preparation Example 9, except that 12 g of diethylenetriamine was replaced by 18.2 g of tetraethylenepentamine and 7.48 g of oleic acyl chloride was replaced by 6.85 g of palmitoyl chloride, so as to prepare the ligninamide L10.

Preparation Example 11

The Preparation Example served to illustrate the preparation of ligninamide L11.
The ligninamide was prepared according to the method in the Preparation Example 9, except that formaldehyde was not added in step (2), so as to prepare the ligninamide product L11.

Example 28

The example served to illustrate the plugging agent provided by the invention.

7 g of the ligninamide L9 and 2.6 g of the acrylamide type polymer VIII were dissolved in formulated water having a degree of mineralization of 5,000 mg/L, the ingredients were stirred at a rotation speed of 500 r/min to form a homogeneous solution; 0.52 g of sodium bisulfite, 0.81 g of sodium dithionite and 5.7 g of a phenolic resin were subsequently added, the total mass of the system was 1 kg, and the system was uniformly stirred to prepare a plugging agent. The gel formation temperature, the complex viscosity after gel formation, the duration without breaking the gel under the gel formation temperature, the plugging rate, and breakthrough pressure gradient of the plugging agent were shown in Table 4.

Example 29

The example served to illustrate the plugging agent provided by the present disclosure.

4 g of the ligninamide L9 and 5 g of the acrylamide-based polymer VIII were dissolved in formulation water having a degree of mineralization of 4,000 mg/L, the ingredients were stirred at a rotation speed of 500 r/min to form a homogeneous solution; 2.35 g of sodium bisulphite, 2.15 g of sodium dithionite, 2 g of phenolic resin were subsequently added, the total mass of the system was 1 kg, and the system was uniformly stirred to prepare a plugging agent. The gel formation temperature, the complex viscosity after gel formation, the duration without breaking the gel under the gel formation temperature, the plugging rate, and breakthrough pressure gradient of the plugging agent were shown in Table 4.

Example 30

The example served to illustrate the plugging agent provided by the present disclosure.

20 g of the ligninamide L9 and 1 g of the acrylamide-based polymer VIII were dissolved in formulated water having a degree of mineralization of 3,000 mg/L, the ingredients were stirred at a rotation speed of 500 r/min to form a homogeneous solution; 0.08 g of sodium bisulfite, 0.12 g of sodium dithionite, 20 g of phenolic resin were subsequently added, the total mass of the system was 1 kg, and the system was uniformly stirred to prepare a plugging agent. The gel formation temperature, the complex viscosity after gel formation, the duration without breaking the gel under the gel formation temperature, the plugging rate, and breakthrough pressure gradient of the plugging agent were shown in Table 4.

Example 31

The example served to illustrate the plugging agent provided by the present disclosure.

The plugging agent was prepared according to the method of Example 28, except that the stabilizer in use was only the sodium bisulfite in an amount of 1.33 g, such that the plugging agent was prepared. The gel formation temperature, the complex viscosity after gel formation, the duration without breaking the gel under the gel formation temperature, the plugging rate, and breakthrough pressure gradient of the plugging agent were shown in Table 4.

Example 32

The example served to illustrate the plugging agent provided by the present disclosure.

The plugging agent was prepared according to the method of Example 28, except that the stabilizer in use was only the sodium dithionite in an amount of 1.33 g, such that the plugging agent was prepared. The gel formation temperature, the complex viscosity after gel formation, the duration without breaking the gel under the gel formation temperature, the plugging rate, and breakthrough pressure gradient of the plugging agent were shown in Table 4.

Example 33

The example served to illustrate the plugging agent provided by the present disclosure.

The plugging agent was prepared according to the method of Example 28, except that among the stabilizers, the sodium bisulfite was replaced with an equal mass of thiourea, and the sodium dithionite was replaced with an equal mass of erythorbic acid to prepare the plugging agent. The gel formation temperature, the complex viscosity after gel formation, the duration without breaking the gel under the gel formation temperature, the plugging rate, and breakthrough pressure gradient of the plugging agent were shown in Table 4.

Example 34

The example served to illustrate the plugging agent provided by the present disclosure.

The plugging agent was prepared according to the method of Example 28, except that the acrylamide-based polymer VIII was replaced with an equal mass of the acrylamide-based polymer VII to prepare the plugging agent. The gel formation temperature, the complex viscosity after gel formation, the duration without breaking the gel under the gel formation temperature, the plugging rate, and breakthrough pressure gradient of the plugging agent were shown in Table 4.

Example 35

The example served to illustrate the plugging agent provided by the present disclosure.

The plugging agent was prepared according to the method of Example 28, except that the acrylamide-based polymer VIII was replaced with an equal mass of the acrylamide-based polymer IX to prepare the plugging agent. The gel formation temperature, the complex viscosity after gel formation, the duration without breaking the gel under the gel formation temperature, the plugging rate, and breakthrough pressure gradient of the plugging agent were shown in Table 4.

Example 36

The example served to illustrate the plugging agent provided by the present disclosure.

The plugging agent was prepared according to the method of Example 28, except that the ligninamide L9 was replaced with the ligninamide L10. The gel formation temperature, the complex viscosity after gel formation, the duration without breaking the gel under the gel formation temperature, the plugging rate, and breakthrough pressure gradient of the plugging agent were shown in Table 4.

Example 37

The example served to illustrate the plugging agent provided by the present disclosure.

The plugging agent was prepared according to the method of Example 28, except that the ligninamide L9 was replaced with the ligninamide L11. The gel formation temperature, the complex viscosity after gel formation, the duration without breaking the gel under the gel formation temperature, the plugging rate, and breakthrough pressure gradient of the plugging agent were shown in Table 4.

Comparative Example 16

The Comparative Example served to illustrate the plugging agent as a reference.

The plugging agent was prepared according to the method of Example 28, except that the plugging agent was prepared by replacing the ligninamide with an equal mass of the acrylamide-type polymer VIII. The gel formation temperature, the complex viscosity after gel formation, the duration without breaking the gel under the gel formation temperature, the plugging rate, and breakthrough pressure gradient of the plugging agent were shown in Table 4.

Comparative Example 17

The Comparative Example served to illustrate the plugging agent as a reference.

The plugging agent was prepared according to the method of Example 35, except that the plugging agent was prepared by replacing the ligninamide with an equal mass of the acrylamide-type polymer IX. The gel formation temperature, the complex viscosity after gel formation, the duration without breaking the gel under the gel formation temperature, the plugging rate, and breakthrough pressure gradient of the plugging agent were shown in Table 4.

Comparative Example 18

The Comparative Example served to illustrate the plugging agent as a reference.

The plugging agent was prepared according to the method of Example 28, except that the plugging agent was prepared by replacing the ligninamide L9 with the ligninamine prepared in step (2). The gel formation temperature, the complex viscosity after gel formation, the duration without breaking the gel under the gel formation temperature, the plugging rate, and breakthrough pressure gradient of the plugging agent were shown in Table 4.

Comparative Example 19

The Comparative Example served to illustrate the plugging agent as a reference.

The plugging agent was prepared according to the method of Example 28, except that the plugging agent was prepared by replacing the ligninamide L9 with an equal mass of lignin. The gel formation temperature, the complex viscosity after gel formation, the duration without breaking the gel under the gel formation temperature, the plugging rate, and breakthrough pressure gradient of the plugging agent were shown in Table 4.

TABLE 4

|  | Gel formation temperature (° C.) | Complex viscosity (mPa · s) | Duration without breaking the gel (d) | Plugging rate (%) | Breakthrough pressure gradient (MPa/m) |
| --- | --- | --- | --- | --- | --- |
| Example 28 | 250 | 28880 | 118 | 99.57 | 9.0 |
| Example 29 | 250 | 32650 | 115 | 99.52 | 7.5 |
| Example 30 | 250 | 34510 | 120 | 99.87 | 9.2 |
| Example 31 | 250 | 28150 | 102 | 99.01 | 8.4 |
| Example 32 | 250 | 27260 | 101 | 99.05 | 8.1 |
| Example 33 | 250 | 28430 | 109 | 99.45 | 8.4 |
| Example 34 | 250 | 26580 | 99 | 99.01 | 7.4 |
| Example 35 | 250 | 28450 | 115 | 99.35 | 8.8 |
| Example 36 | 250 | 27650 | 98 | 99.22 | 7.9 |
| Example 37 | 250 | 25470 | 50 | 99.00 | 6.5 |
| Comparative Example 16 | 250 | 17870 | 41 | 81.66 | 2.1 |
| Comparative Example 17 | 160 | 18150 | 39 | 87.11 | 2.7 |
| Comparative Example 18 | 250 | 7560 | 12 | 60.10 | 1.3 |
| Comparative Example 19 | 250 | 8150 | 24 | 73.25 | 1.4 |

As can be seen from comparison results of the Examples and Comparative Examples, the present disclosure provides a novel lignin-modified product and a preparation method thereof, and inventively uses the lignin-modified product in the water plugging and profile control process of oilfield, the present disclosure finally improves properties of the water plugging and profile control agent by subjecting the lignin to amination modification and acylation modification, so as to increase cross-linking sites of the lignin and improve cross-linking activity of the lignin. The plugging agent provided by the present invention can chronically and effectively plug the steam channeling channel at higher oil reservoir temperature (140-250° C.) for a long time (50-120 d), and have a higher strength; the plugging agent with a high temperature resistance is capable of effectively plugging the high permeability layers, adjusting the steam suction difference between high permeable layer and low permeable layer, changing the direction of injected steam, so as to fulfill the purposes of alleviating vapor-channeling, eliminating cross-well interferences, expanding the swept volume of injected steam, and increasing the oil production in an oil recovery cycle, and achieving the efficient development of high temperature oil reservoirs.

The invention claimed is:

1. A plugging agent for oil extraction in an oilfield, wherein the plugging agent comprises a ligninamide, an acrylamide-based polymer, a cross-linking agent and a stabilizer.

2. The plugging agent according to claim 1, wherein the ligninamide is a hydrolyzed ligninamide.

3. The plugging agent according to claim 1, wherein the acrylamide-based polymer is at least one selected from a group consisting of an anionic acrylamide-based polymer, a cationic acrylamide-based polymer, a nonionic acrylamide-based polymer and an amphoteric acrylamide-based polymer;

and/or, the acrylamide-based polymer has a weight average molecular weight within a range of 5,000,000-35,000,000 g/mol;

and/or, the acrylamide-based polymer is a hydrolyzed acrylamide-based polymer;

and/or, the hydrolyzed acrylamide-based polymer has a degree of hydrolysis within a range of 15-30%.

4. The plugging agent according to claim 1, wherein the cross-linking agent is at least one selected from a group consisting of an aluminium cross-linking agent, polyethyleneimine, phenolic resin and a chromium cross-linking agent.

5. The plugging agent according to claim 1, wherein the ligninamide is contained in an amount of 0.1-5.5 wt %, the acrylamide polymer is contained in an amount of 0.01-3.5 wt %, the cross-linking agent is contained in an amount of 0.05-4.5 wt %, and the stabilizer is contained in an amount of 0.01-2.5 wt %, based on the total weight of the plugging agent.

6. The plugging agent according to claim 1, wherein the plugging agent further comprises a pH adjusting agent;

and/or, the pH adjusting agent is contained in an amount of 0.01-0.45 wt %, based on the total weight of the plugging agent;

and/or, the pH adjusting agent is at least one selected from a group consisting of dilute hydrochloric acid, dilute sulfuric acid, sodium hydroxide solution, sodium carbonate solution, sodium bicarbonate solution, sodium acetate solution and ammonia water.

7. The plugging agent according to claim 1, wherein the aluminium cross-linking agent is aluminium citrate and/or polyaluminum;

and/or, the polyethyleneimine has a weight average molecular weight within a range of 3,000-100,000 g/mol;

and/or, the chromium cross-linking agent is at least one selected from a group consisting of sodium dichromate, ammonium dichromate and potassium dichromate;

and/or, the stabilizer is at least one selected from a group consisting of sodium thiosulfate, sodium sulfite, sodium bisulfite, sodium dithionite, metaphenylene diamine, erythorbic acid and thiourea.

8. The plugging agent according to claim 5, wherein the ligninamide is contained in an amount of 0.4-2 wt %, the acrylamide polymer is contained in an amount of 0.01-1.5 wt %, the cross-linking agent is contained in an amount of 0.05-2 wt %, and the stabilizer is contained in an amount of 0.02-1 wt %, based on the total weight of the plugging agent.

* * * * *